US008701360B2

(12) United States Patent
Ressler

(10) Patent No.: US 8,701,360 B2
(45) Date of Patent: Apr. 22, 2014

(54) METHOD AND APPARATUS FOR ASSEMBLING PHOTOVOLTAIC MODULES

(75) Inventor: Stephen Daniel Ressler, Wilmington, DE (US)

(73) Assignee: General Electric Company, Schenectady, NY (US)

(*) Notice: Subject to any disclaimer, the term of this patent is extended or adjusted under 35 U.S.C. 154(b) by 1052 days.

(21) Appl. No.: 12/151,806

(22) Filed: May 9, 2008

(65) Prior Publication Data

US 2008/0289679 A1 Nov. 27, 2008

Related U.S. Application Data

(60) Provisional application No. 60/940,313, filed on May 25, 2007.

(51) Int. Cl.
*H02N 6/00* (2006.01)
*H01L 31/042* (2006.01)
*H01L 31/00* (2006.01)
*E04D 13/18* (2006.01)
*E04H 14/00* (2006.01)

(52) U.S. Cl.
USPC .......... 52/173.3; 136/244; 136/251; 136/252; 136/259

(58) Field of Classification Search
USPC .......... 136/243–244, 251–252, 259; 52/173.3
See application file for complete search history.

(56) References Cited

U.S. PATENT DOCUMENTS

| 5,338,369 | A | 8/1994 | Rawlings |
| 6,111,189 | A | 8/2000 | Garvison et al. |
| 6,365,824 | B1* | 4/2002 | Nakazima et al. ............ 136/251 |
| 6,465,724 | B1 | 10/2002 | Garvison et al. |
| 6,506,970 | B2 | 1/2003 | Yamawaki |
| 2004/0000334 | A1* | 1/2004 | Ressler ........................ 136/251 |
| 2007/0012353 | A1 | 1/2007 | Fischer et al. |
| 2007/0295385 | A1 | 12/2007 | Sheats et al. |
| 2007/0295386 | A1 | 12/2007 | Capps et al. |
| 2007/0295387 | A1 | 12/2007 | Adriani et al. |
| 2007/0295389 | A1 | 12/2007 | Capps et al. |
| 2007/0295390 | A1 | 12/2007 | Sheats et al. |
| 2008/0000174 | A1* | 1/2008 | Flaherty et al. ............. 52/173.3 |

* cited by examiner

*Primary Examiner* — Jonathan Johnson
*Assistant Examiner* — Lindsey Bernier
(74) *Attorney, Agent, or Firm* — Jean K. Testa; Fletcher Yoder, P.C.

(57) ABSTRACT

A method of assembling a solar array includes forming at least one substrate member that includes an upper surface and a lower surface. The lower surface is contoured with a shape that at least partially conforms to at least a portion of a contoured roof. The upper surface includes at least one elevated portion and a plurality of substantially planar regions. The at least one elevated portion is offset a predetermined height above at least one other portion of the substrate member. Each of the plurality of substantially planar regions is a distance above the at least one elevated portion and is oriented to receive at least one photovoltaic laminate. The method also includes coupling the at least one substrate member to at least a portion of the contoured roof.

22 Claims, 6 Drawing Sheets

METHOD AND APPARATUS FOR ASSEMBLING PHOTOVOLTAIC MODULES

CROSS REFERENCE TO RELATED APPLICATIONS

This application claims priority to and the benefit of the filing date of U.S. Provisional Application No. 60/940,313 filed on May 25, 2007, which is hereby incorporated by reference in its entirety.

BACKGROUND OF THE INVENTION

This invention relates generally to photovoltaic modules and, more particularly, to methods and apparatus for integrating such photovoltaic modules with profiled roofing geometries.

Many known photovoltaic modules are configured for use on flat, or planar profile tile roofs, wherein an integration with photovoltaics can be achieved by designing a planar plate photovoltaic module in the form of a planar roof tile. However, integrating planar plate photovoltaic modules into a roof with high profile roof tiles, such as curved roof tiles, especially S-tiles, may be difficult to achieve in a cosmetically appealing form. Many known methods for mounting photovoltaic modules on high profile tile roofs use a rack structure that is attached to and extends outward from the roofing material. In addition the potentially unaesthetic qualities of such rack structures, the installation of such rack structures generally requires numerous penetrations through the roofing material for mounting stanchions. Each penetration must be meticulously flashed and sealed to prevent water leakage. Moreover, most known photovoltaic module rack structures have a tendency to collect dirt, debris, and facilitate plant growth. Over time, associated fouling of the photovoltaic modules may reduce the photovoltaic sensitivity of the modules, thereby reducing module electrical output.

Other known photovoltaic modules use flush-mounted photovoltaic modules with transition flashing at the interfaces of the photovoltaic modules and the surrounding high profile roof tiles. The transition flashings serve as functional roofing elements, that facilitate protecting the building from the same natural elements as the roofing tiles. Accordingly, to mate successfully to the varying geometric interfaces that exist around the perimeter of the photovoltaic array, a large number of unique transition flashings must be designed and manufactured. While technically feasible, this approach may create a complicated installation that requires numerous parts that must be located and installed correctly on the jobsite, thereby increasing the associated costs of installation. Moreover, known photovoltaic modules are generally configured as an integrated array, wherein the use of transition flashing is inherently limited to rectangular forms, which may preclude homes from solar array installation that are otherwise good candidates.

BRIEF DESCRIPTION OF THE INVENTION

In one aspect, a method of assembling a solar array is provided. A method of assembling a solar array includes forming at least one substrate member that includes an upper surface and a lower surface. The lower surface is contoured with a shape that at least partially conforms to at least a portion of a contoured roof. The upper surface includes at least one elevated portion and a plurality of substantially planar regions. The at least one elevated portion is offset a predetermined height above at least one other portion of the substrate member. Each of the plurality of substantially planar regions is a distance above the at least one elevated portion and is oriented to receive at least one photovoltaic laminate. The method also includes coupling the at least one substrate member to at least a portion of the contoured roof.

In another aspect, a photovoltaic module is provided. The photovoltaic module includes at least one substrate member configured to couple to at least a portion of a roof. The substrate member includes a contoured shape that at least partially conforms to at least a contoured portion of the roof. The contoured shape includes at least one elevated portion and a plurality of substantially planar regions elevated at a predetermined height above the at least one elevated portion. The plurality of substantially planar regions are configured to receive at least one photovoltaic laminate. The module also includes the at least one photovoltaic laminate coupled to the at least one substrate member.

In a further aspect, a solar array is provided. The solar array includes a first photovoltaic module and a second photovoltaic module coupled to the first photovoltaic module. The first photovoltaic module and the second photovoltaic module include at least one substrate member configured to couple to at least a portion of a roof. The contoured shape includes at least one elevated portion and a plurality of substantially planar regions elevated at a predetermined height above the at least one elevated portion. The plurality of substantially planar regions are configured to receive at least one photovoltaic laminate. The module also includes the at least one photovoltaic laminate coupled to the at least one substrate member.

The methods and apparatus described herein, for integrating such photovoltaic modules with profiled roofing geometries, facilitate the installation of photovoltaic solar arrays on roofing geometries, other than planar roofing geometries, and thus increases the number of homes and facilities that may use solar arrays, while reducing associated installation costs. Moreover, improved aesthetics of such integrated photovoltaic modules on irregular roofing geometries facilitates increased commercial potential for roof-mounted solar arrays.

DETAILED DESCRIPTION OF THE INVENTION

The methods and apparatus described herein for integrating such photovoltaic modules with profiled roofing geometries, facilitates an installation of photovoltaic solar arrays on roofing geometries, other than flat, or planar roofing geometries, thereby increasing the number of homes and facilities that may use solar arrays while also facilitating a reduction of associated installation costs. Specifically, integrating photovoltaic modules that include a molded polymer base, or substrate member, that substantially matches the geometry of high profile, or curved, roof tiles provide an effective method for adapting photovoltaic solar arrays to a variety of roofing geometries. Such solar arrays require no penetrations of existing roofing materials or specialized mounting hardware for attachment thereto. Rather, in lieu of such penetrations, specialized hardware and framing, the substrate member is coupled to existing roofing tiles via a friction fit, double-sided tape, and/or structural adhesive compounds. In addition, a tempered glass photovoltaic laminate, or superstrate, is coupled to the substrate member by molded features (i.e., a snap fit), standard retaining clips, standard screw fasteners, structural adhesive compounds, and/or double-sided tape. Such modules as described herein facilitate reducing dirt collection and plant growth on the superstrates. As such, the potential for shading and fouling of the photovoltaic sensitive portions of the laminates is also facilitated to be reduced. Also, the modules described herein have a greater resistance to wind uplift forces than known photovoltaic modules. Moreover, the operation of the photovoltaic modules described herein is substantially similar to that of known solar arrays designed for or used with planar roofs. Further, the improved aesthetics, in conjunction with reduced installation costs and enhanced performance qualities, of the integrated photovoltaic modules described herein enables such modules to be a commercially viable alternative to standard, known roof-mounted solar arrays.

Figure 1:
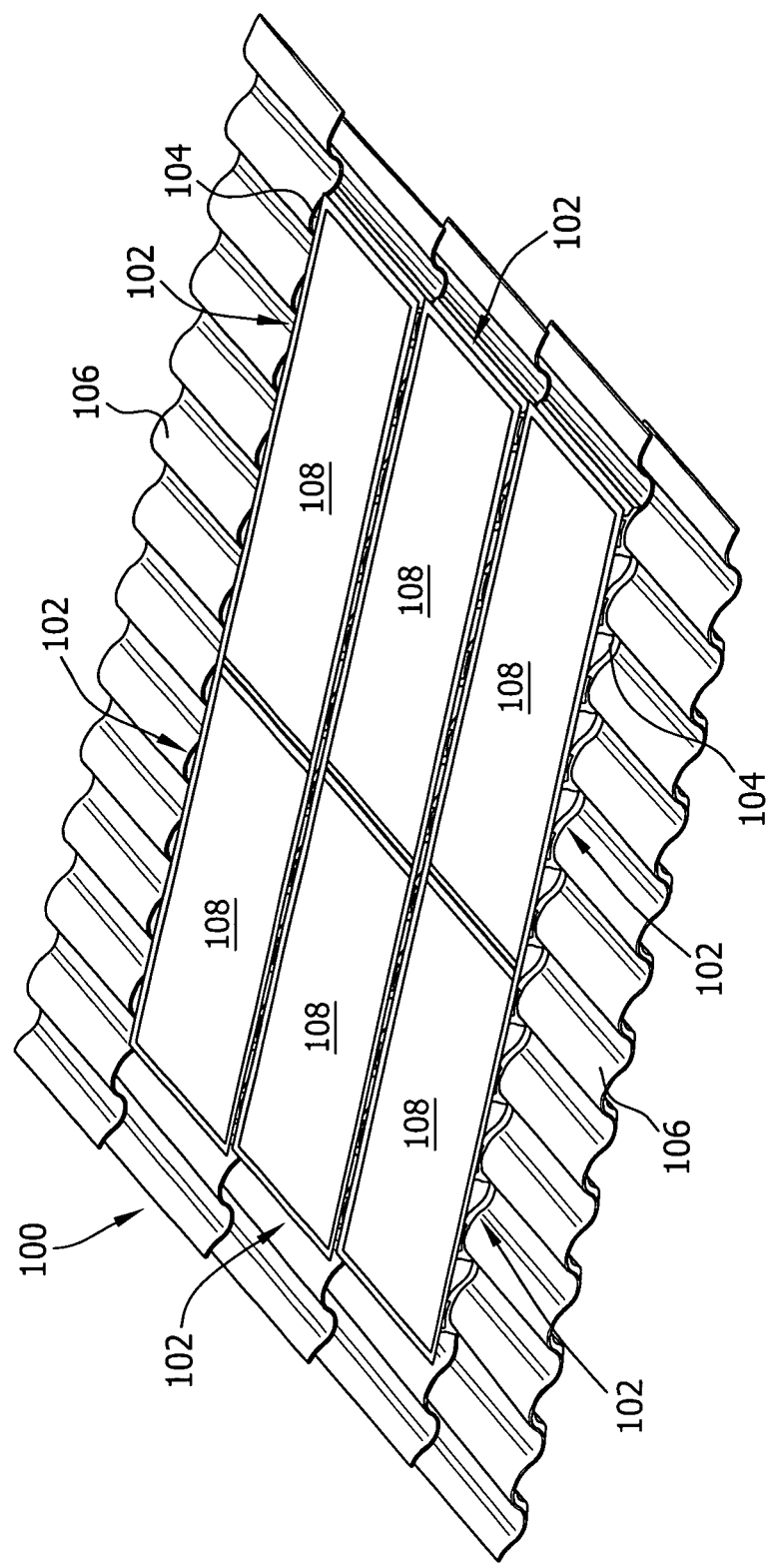
FIG. 1 is a schematic view of an exemplary solar array including a plurality of exemplary S-tile roof integrated photovoltaic modules.

FIG. 1 is a schematic view of an exemplary solar array 100 that includes a plurality of exemplary S-tile roof integrated photovoltaic modules 102. Each module 102 includes a contoured substrate member 104 that is coupled to a plurality of contoured roof tiles 106 that each have a S-tiled geometry. Each module 102 also includes a superstrate, or photovoltaic laminate 108, that is coupled to substrate member 104. In the exemplary embodiment, solar array 100 includes six modules 102. Alternatively, array 100 may include any number of modules 102 that enables operation of array 100 as described herein.

Figure 2:
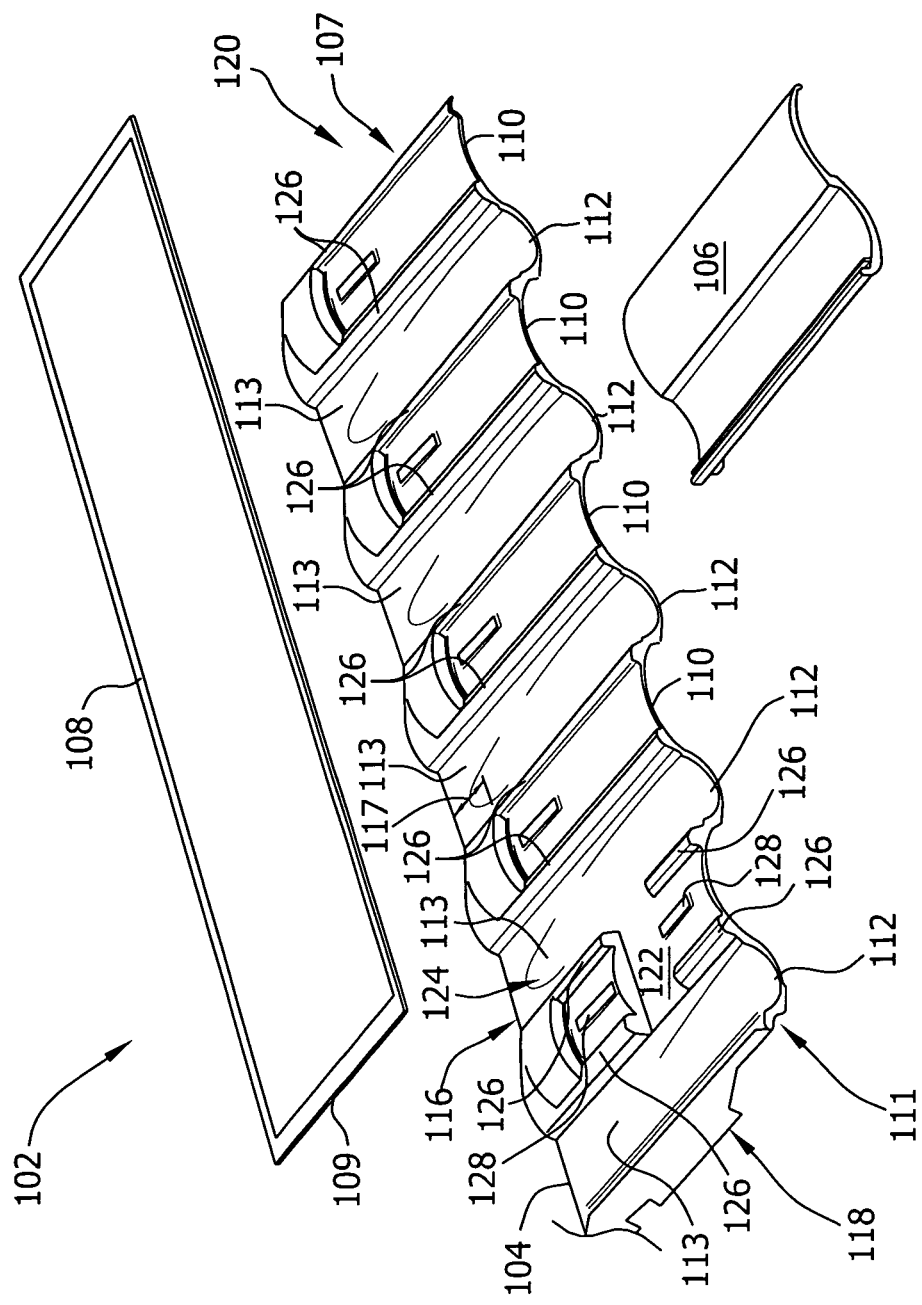
FIG. 2 is a schematic exploded view of one of the S-tile roof integrated photovoltaic modules shown in FIG. 1.

FIG. 2 is a schematic exploded view of an exemplary S-tile roof integrated photovoltaic module 102. In the exemplary embodiment, photovoltaic laminate 108 is fabricated from tempered glass and includes a bare glass perimeter 109. Alternatively, laminate 108 may be fabricated from any materials that facilitate operation of array 100 and module 102 as described herein including, but not limited to, an EVA encapsulant, silicon solar cells and a composite backsheet. Moreover, in the exemplary embodiment, substrate member 104 is formed from a ultraviolet (UV) ray resistant polymeric material that substantially conforms to the geometry of roof tile 106. Such substrate material can be colored to enable it to coordinate with common roof tile colors. Alternatively, substrate member 104 may be formed from any material that facilitates operation of array 100 and module 102 as described herein.

Substrate member 104 includes a plurality of elevated portions 110 and a plurality of depressed portions 112 that at least partially define an upper surface 107 and a lower surface 111 of substrate member 104. Elevated portions 110 and depressed portions 112 are oriented in an alternating pattern, wherein portions 112 and 110, in the exemplary embodiment, are in a substantially sinusoidal pattern. In the exemplary embodiment, substrate member 104 includes five elevated portions 110 and five depressed portions 112. In the exemplary embodiment, each depressed portion 112 includes at least one fastener orifice 113 defined therein that receives a fastener (not shown), if needed. However, it should be noted that typically, fasteners are not needed in the exemplary embodiment. Moreover, portions 110 and 112 at least partially define at least one perimeter portion (i.e., portions 114, 116, 118, and 120 that are described in more detail below) that couples a first substrate member 104 to a second substrate member 104, and couples at least one substrate member 104 to roof tile 106. Specifically, in the exemplary embodiment, each substrate member 104 includes a first perimeter portion 114 that couples with, or interlocks with a second perimeter portion 116 of an adjacent substrate member 104 (not shown in FIG. 2). Fastener orifices 113 are each defined a predetermined distance 117 from perimeter 116, wherein such distance 117 facilitates increasing a resistance of module 102 to wind uplift forces. In the exemplary embodiment, distance 117 is approximately 7.62 centimeters (cm) (3 inches (in.)). Alternatively, distance 117 may be any distance that facilitates operation of array 100 and module 102 as described herein.

Also, in the exemplary embodiment, substrate member 104 includes a third perimeter portion 118 that includes a depressed portion 112 and a fourth perimeter portion 120 that includes an elevated portion 110. Such a configuration facilitates coupling, or interlocking, adjacent substrate members 104 (not shown in FIG. 2) together. Moreover, portions 118 and 120 enable substrate member 104 to be coupled to roof tile 106. The coupling, or interlocking, substrate members 104 to each other and to roof tiles 106 is described in more detail below. Alternately, substrate member 104 may have any configuration that facilitates operation of array 100 and module 102 as described herein.

Further, in the exemplary embodiment, a recessed area, or cutout 122 that is sized to receive at least a portion of a junction box (not shown in FIG. 2) and that is defined or coupled within an elevated portion 110 closest to third perimeter portion 118. Alternatively, a junction box cutout 122 may be defined or coupled in any elevated portion 110 and/or any depressed portion 112 that facilitates operation of array 100 and module 102 as described herein. Moreover, at least one, or as shown in the exemplary embodiment, a plurality of wiring slots 124 that receive wiring (not shown in FIG. 2) associated with the junction box are defined within an elevated portion 110 closest to third perimeter portion 118. Alternatively, wiring slots 124 may be defined in any elevated portion 110 and/or any depressed portion 112 that facilitates operation of array 100 and module 102 as described herein.

Also, in the exemplary embodiment, at least one, or as shown in the exemplary embodiment, a plurality of elevated substantially planar regions 126 that receive photovoltaic laminate 108 are formed on each elevated portion 110 at a predetermined height above elevated portion 110. Regions 126 reduce the need for support and securing photovoltaic laminate 108 in place via recessed apertures. Moreover, in the exemplary embodiment, each planar region 126 is formed on the interface defined between elevated portions 110 and depressed portions 112. Further, in the exemplary embodiment, an elevated portion 110 closest to third perimeter portion 118 includes an additional plurality of elevated substantially planar regions 128 that are substantially centered between two regions 126. Specifically, the additional regions 128 facilitate increasing weight bearing and support of laminate 108, while reducing the need for support and securing photovoltaic laminate 108 in place via recessed apertures. Alternatively, substrate member 104 may include any number of planar regions 126 and/or 128 in any configuration or orientation that facilitates operation of array 100 and module 102 as described herein.

Figure 3:
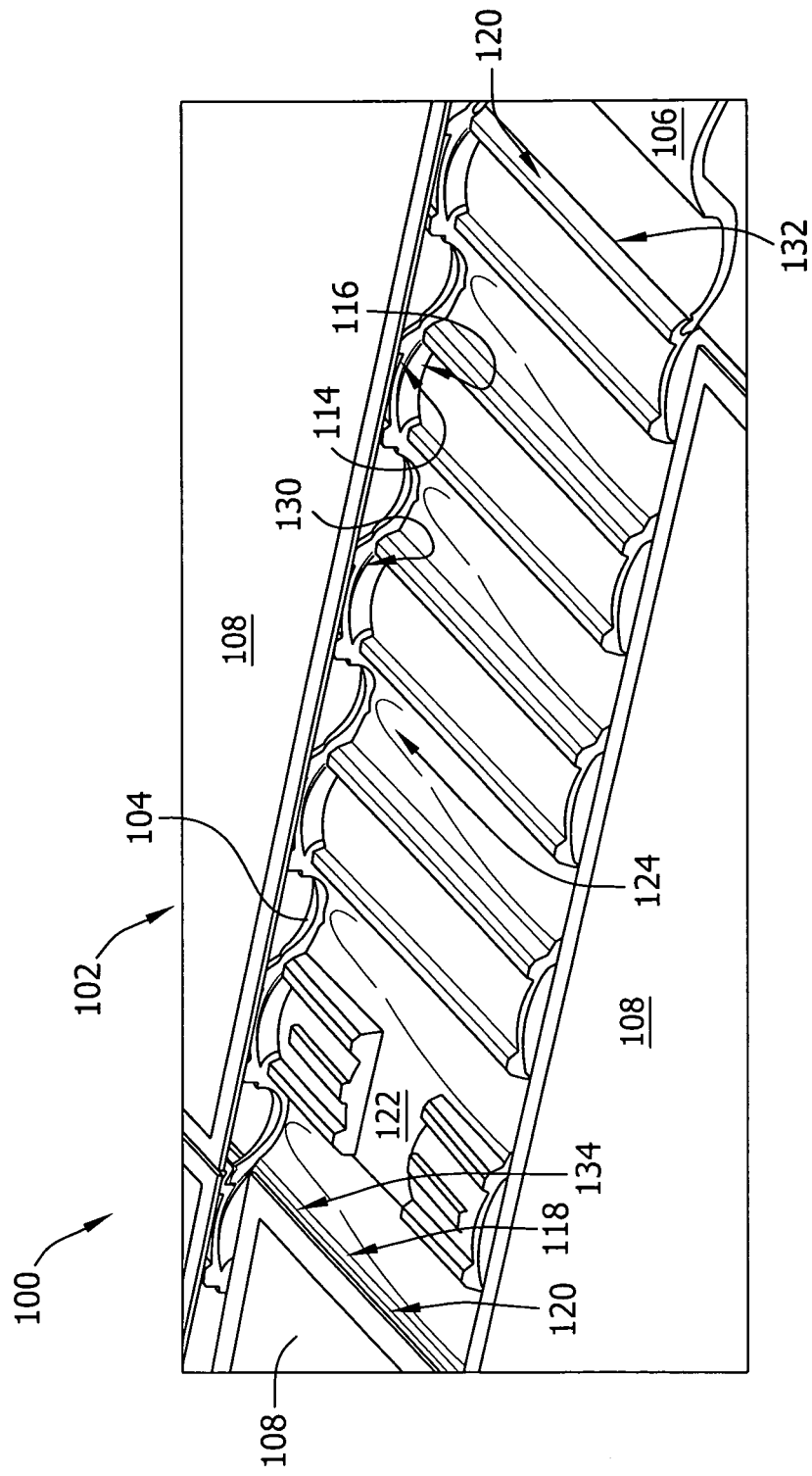
FIG. 3 is a schematic view of an exemplary substrate member that may be used with the S-tile roof integrated photovoltaic module shown in FIGS. 1 and 2.

FIG. 3 is a schematic view of substrate member 104. Moreover, array 100 is illustrated with one photovoltaic laminate 108 removed to more clearly illustrate a substrate member 104 coupled to adjacent substrate members 104. Moreover, first perimeter portion 114 of one substrate member 104 is coupled to second perimeter portion 116 of an adjacent substrate member 104, thereby forming a first joint 130. In the exemplary embodiment, perimeter portions 114 and 116 are coupled together using a friction fit. Alternatively, perimeter portions 114 and 116 are coupled together using any method that facilitates operation of array 100 as described herein including, but not limited to, double-sided tape and/or structural adhesive compounds.

In the exemplary embodiment, substrate member 104 is coupled to roof tile 106 as fourth perimeter 120 is coupled to a portion of tile 106, wherein fourth perimeter 120 is formed with a predetermined configuration for coupling to tiles 106, such that a second joint 132 is defined. In the exemplary embodiment, perimeter portion 120 is coupled to a portion of roof 106 with a friction fit. Alternatively, perimeter portion 120 may be coupled to roof 106 using any method that facilitates operation of array 100 as described herein including, but not limited to, double-sided tape and/or structural adhesive compounds.

Further, in the exemplary embodiment, substrate member 104 is coupled to another adjacent substrate member 104 by coupling third perimeter 118 to fourth perimeter 120 of adjacent substrate member 104, thereby forming a third joint 134. In the exemplary embodiment, perimeter portions 118 and 120 are coupled together using a friction fit. Alternatively, perimeter portions 118 and 120 may be coupled together using any method that facilitates operation of array 100 as described herein including, but not limited to, double-sided tape and/or structural adhesive compounds.

Moreover, in the exemplary embodiment, in lieu of forming penetrations (not shown) in roof tiles 106, and/or the use of specialized hardware (not shown), each substrate member 104 may be coupled to existing roofing tiles 106 with a friction fit. Alternatively, each substrate member 104 may be coupled to existing roofing tiles 106 using any coupling method that facilitates operation of array 100 as described herein including, but not limited to, double-sided tape and/or structural adhesive compounds.

Figure 4:
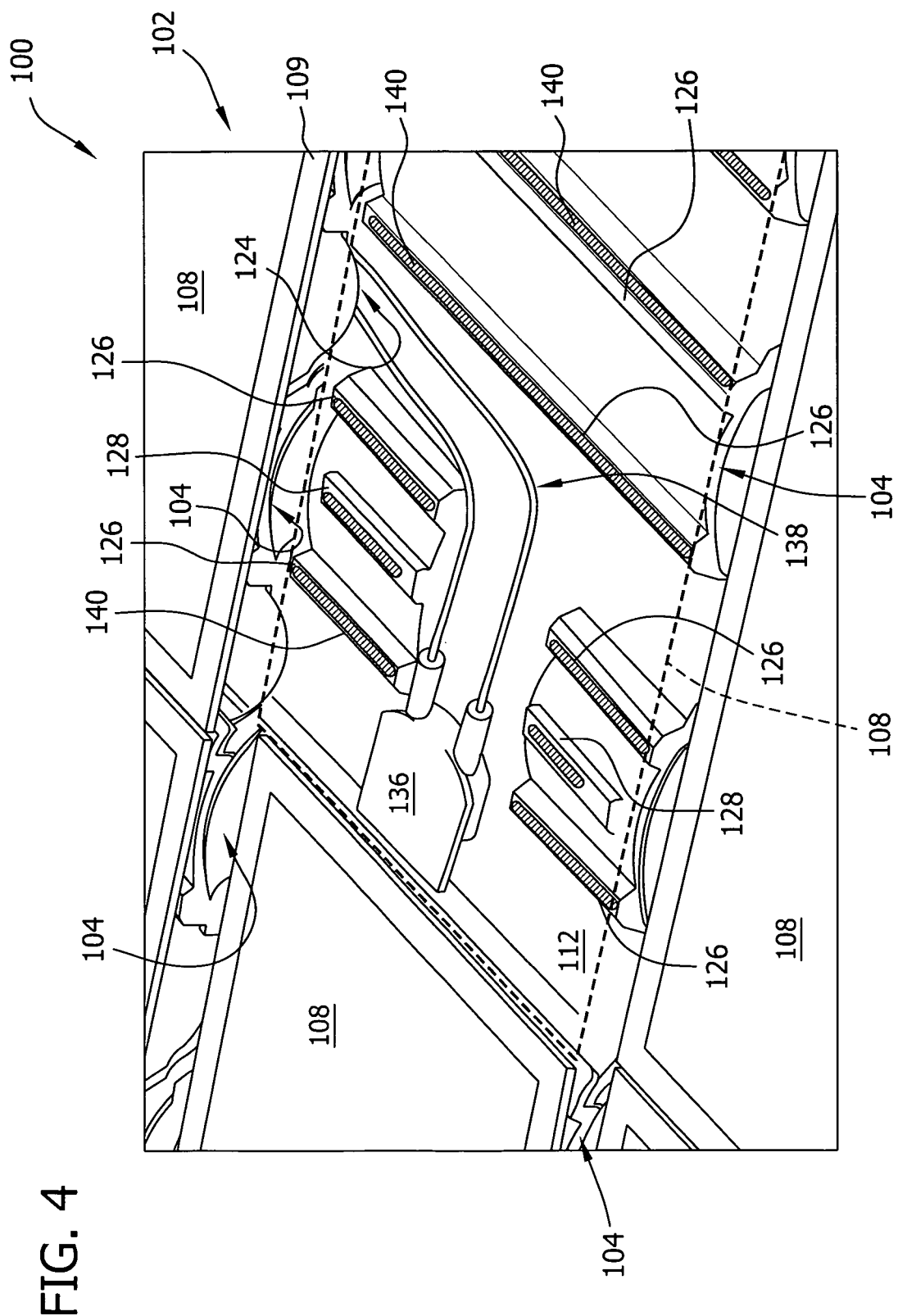
FIG. 4 is a schematic view of the S-tile roof integrated photovoltaic module shown in FIGS. 1 and 2 fully assembled within the solar array shown in FIG. 1.

FIG. 4 is a schematic view of an exemplary photovoltaic module 102 fully assembled within solar array 100. A plurality of coupled or interlocked substrate members 104 are illustrated. Moreover, a plurality of photovoltaic laminates 108 are illustrated, with one photovoltaic laminate 108 illustrated in phantom to facilitate showing exemplary features of a fully assembled module 102. Moreover, junction box cutout 122 and wiring slots 124 are illustrated for perspective. In the exemplary embodiment, a junction box 136 is positioned within a portion of a depressed region 112 and, more specifically, within a portion of cutout 122. A pair of electrical wires 138 are electrically coupled to junction box 136 and an electrical receptacle (not shown), wherein wires 138 are routed through slots 124. Junction box 136 is electrically coupled to at least one associated photovoltaic laminate 108.

Also, in the exemplary embodiment, each photovoltaic laminate 108 is secured to each associated substrate member 104 with a layer of structural adhesive compound 140 extending across each planar region 126 and 128. Alternatively, each laminate 108 may be coupled to each associated substrate member 104 with any coupling method and combination of coupling methods that enables operation of array 100 and module 102 including, but not limited to, molded features (such as, a snap fit), standard retaining clips, standard screw fasteners, and/or double-sided tape.

Use of structural adhesive compound 140, on an underside of laminate 108, in cooperation with bare glass perimeters 109, facilitates reducing collection of dirt and plant growth because of no frames, connections, or attachments are used on glass perimeters 109. As such, a potential for shading and fouling of the photovoltaic sensitive portions of laminate 108 is also facilitated to be reduced.

Figure 5:
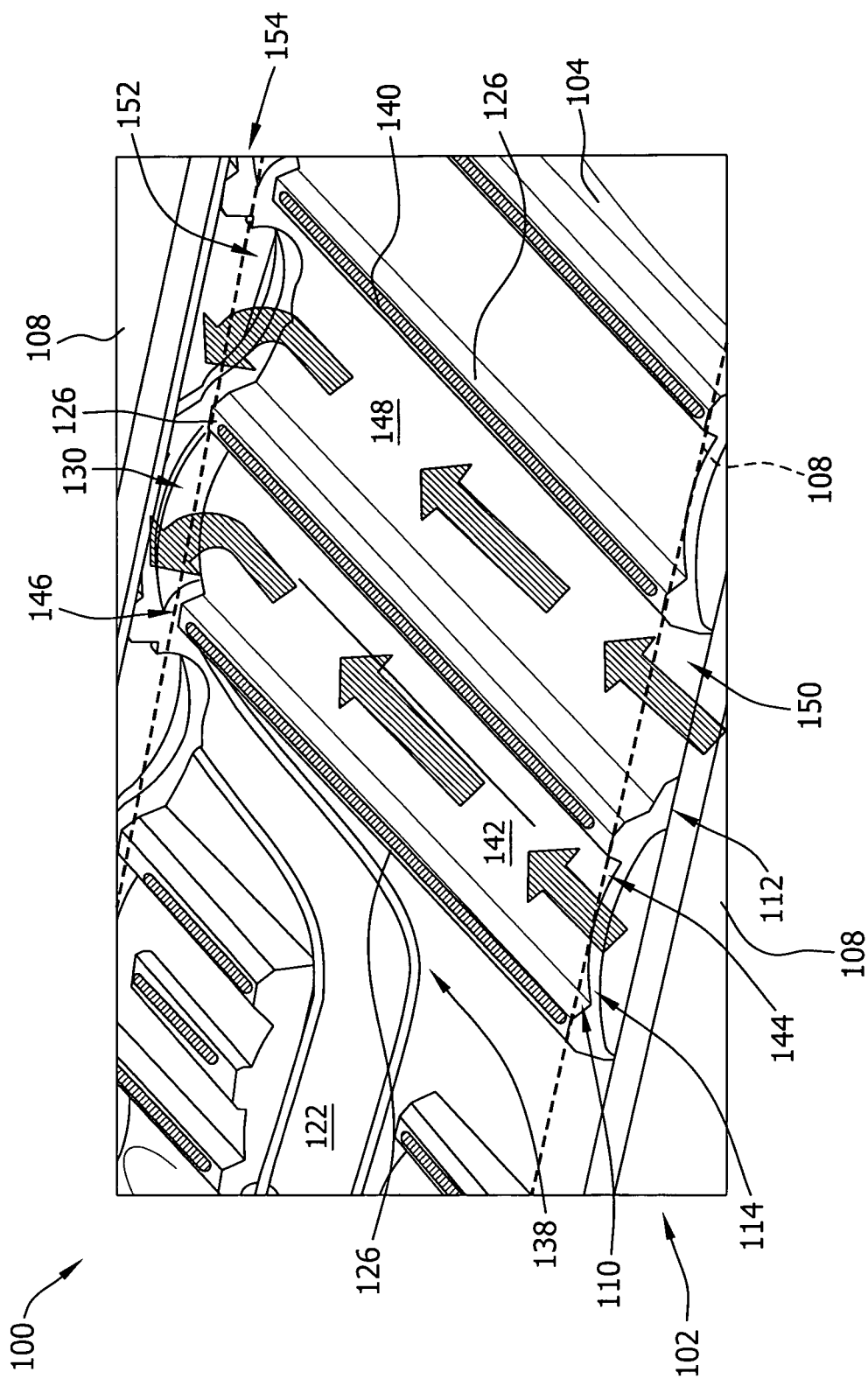
FIG. 5 is a schematic view of exemplary cooling channels that may be formed in the photovoltaic module shown in FIGS. 1 and 2.

FIG. 5 is a schematic view of exemplary cooling channels 142 and 148 that may be formed in photovoltaic module 102. Cutout 122 and wires 138 are merely illustrated for perspective. Moreover, a plurality of photovoltaic laminates 108 are illustrated, with one photovoltaic laminate 108 illustrated in phantom, to facilitate showing exemplary cooling features of a fully assembled module 102. Specifically, a portion of each elevated portion 110, including elevated planar regions 126, cooperate with a portion of an associated photovoltaic laminate 108 to form an upper cooling channel 142. Moreover, a portion of first perimeter portion 114 cooperates with a portion of laminate 108 to define an upper cooling channel inlet 144, and, a portion of first joint 130 cooperates with a portion of laminate 108 to form an upper cooling channel vent 146.

Also, in the exemplary embodiment, a portion of each depressed portion 112 cooperates with a portion of at least one associated photovoltaic laminate 108 and elevate planar regions 126 to form a lower cooling channel 148. Moreover, a portion of first perimeter portion 114 cooperates with a portion of laminate 108 to define a lower cooling channel inlet 150, and, a portion of first joint 130 cooperates with a portion of laminate 108 to form a lower cooling channel vent 152.

Moreover, in the exemplary embodiment, a warm air vent channel 154 is defined between pairs of adjacent photovoltaic laminates 108, wherein channel 154 is coupled in flow communication with channels 142 and 148. As such, cool air may enter each channel 142 and 148 through associated inlets 144 and 150, respectively. Such air is channeled through channels 142 and 148 via natural convection such that warm air is discharged through vents 146 and 152, respectively, and subsequently from modules 102 via warm air vent channels 154 (as shown by the arrows).

An exemplary method of assembling solar array 100 (shown in FIG. 1) includes forming at least one substrate member 104 that includes upper surface 107 and lower surface 111. Lower surface 107 is contoured with a shape that at least partially conforms to at least a portion of contoured roof 106. Upper surface 111 includes at least one elevated portion 110 and a plurality of substantially planar regions 126. At least one elevated portion 110 is offset a predetermined height above at least one other portion 112 of substrate member 104. Each of the plurality of substantially planar regions 126 is a distance above at least one elevated portion 110 and is oriented to receive at least one photovoltaic laminate 108. The method also includes coupling at least one substrate member 104 to at least a portion of contoured roof 106.

In the exemplary embodiment, coupling substrate members 104 to roof tiles 106, and coupling adjacent substrate members 104 to each other as described above, in cooperation with coupling laminate 108 to each associated substrate member 104 as described above, facilitates increasing an overall stiffness of module 102. As such, the susceptibility of modules 102 to wind uplift forces is facilitated to be reduced. Moreover, providing plurality of channels 142 and 148 with associated vents 146 and 152, respectively, and vent channel 154 facilitates equalizing wind forces induced to both sides of laminate 108.

Figure 6:
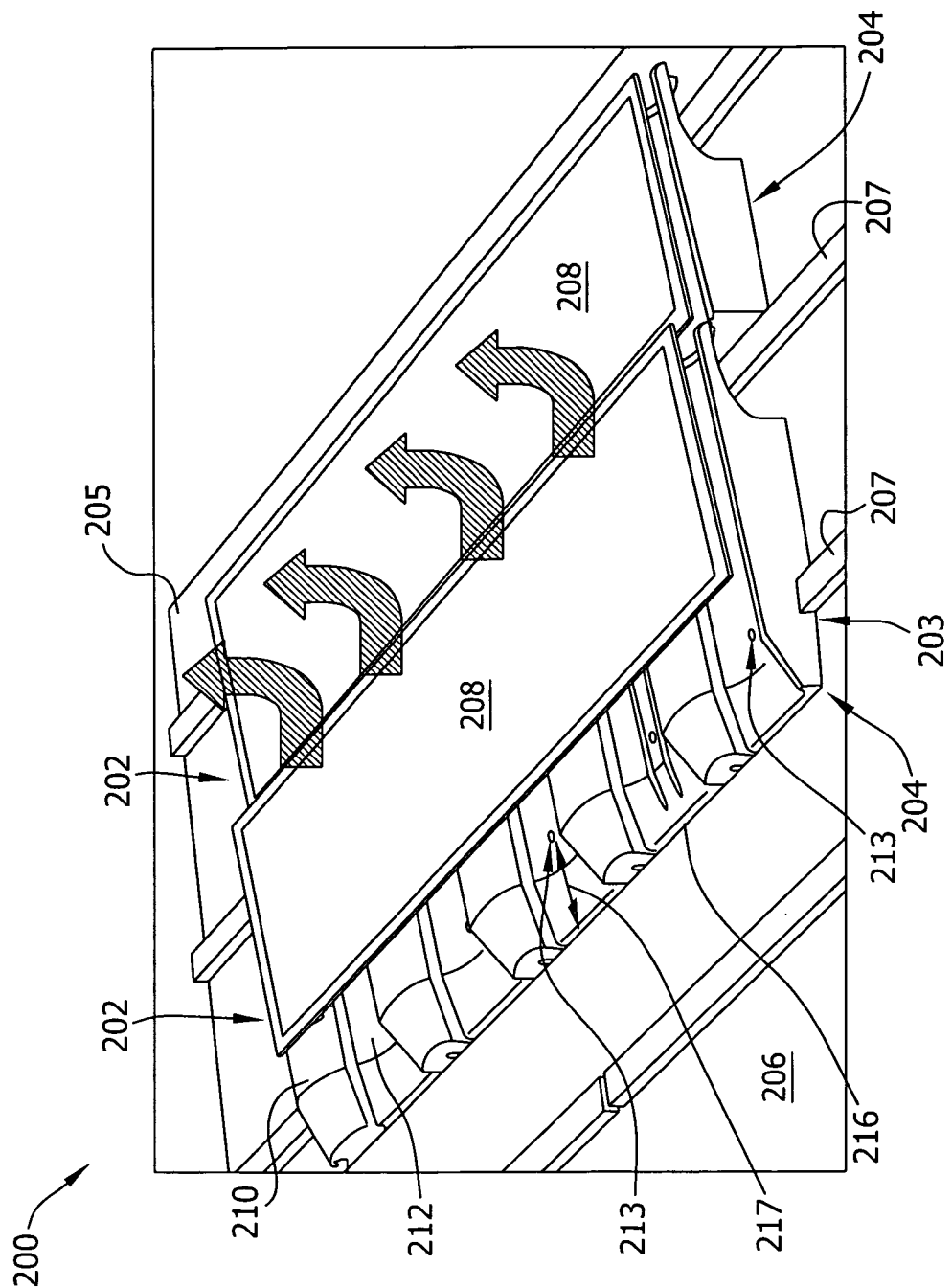
FIG. 6 is a schematic view of an alternative solar array including a plurality of irregular roof integrated photovoltaic modules.

FIG. 6 is a schematic view of an alternative solar array 200 that includes a plurality of irregular roof integrated photovoltaic modules 202. Array 200 is used with a roof 209 that includes at least one, or more specifically in the exemplary embodiment, a plurality of irregularities 207 and an apex 205. Each module 202 includes a contoured substrate member 204 that is substantially similar to substrate member 104 (shown in FIGS. 2 and 3). Specifically, in the exemplary embodiment, each module 202 includes five elevated portions 210 and five depressed portions 212, with two differences. The first difference is that at least one substrate member cutout 203 is defined that enables substrate member 204 to straddle at least one roof irregularity 207. The second difference is that a fastener (not shown) is inserted into each of five fastener orifices 213 to secure substrate member 204 to roof irregularities 207 without penetrating other portions of roof 206. Similar to substrate member 104, fastener orifices 213 are defined a predetermined distance 217 from an outer perimeter 216 of substrate 204, wherein such a setback facilitates increasing a resistance of module 202 to wind uplift forces. In the exemplary embodiment, distance 217 is approximately 7.62 centimeters (cm) (3 inches (in.)). Alternatively, distance 217 may be any distance that enables operation of array 200 and module 202 as described herein. A photovoltaic laminate 208 is substantially similar to laminate 108.

Module 202, is similar to module 102 (shown in FIG. 2), and is substantially resistant to wind uplift forces. Specifically, the construction of the exemplary embodiment, coupling substrate members 204 to roof irregularities 207, and coupling adjacent substrate members 204 to each other as described above, facilitates increasing an overall stiffness of each module 202, thereby mitigating the susceptibility of modules 202 to wind uplift forces. Moreover, providing a plurality of channels (not shown) similar to channels 142 and 148 (shown in FIG. 5) and a vent channel 254 facilitates equalizing wind forces induced to both sides of laminate 208. Further, channeling wind through depressed portions 212 to vent channel 254 (as shown by the arrows) further facilitates resistance to wind uplift forces.

The methods and apparatus described herein for integrating photovoltaic modules with profiled roofing geometries, facilitates an installation of photovoltaic solar arrays on roofing geometries, other than flat, or planar roofing geometries. Specifically, integrating photovoltaic modules that include a molded polymer base, or substrate member, that substantially matches the geometry of high profile, or curved, roof tiles provide an effective method for adapting photovoltaic solar arrays to a variety of roofing geometries. Such solar arrays have improved aesthetics and require no penetrations of existing roofing materials or specialized mounting hardware for attachment thereto. In addition, a tempered glass photovoltaic laminate, or superstrate, is coupled to the substrate member. Such modules as described herein facilitate reducing installation costs and dirt collection and plant growth on the superstrates. Also, the modules described herein have a greater resistance to wind uplift forces than known photovoltaic modules with operation substantially similar to that of known solar arrays designed for or used with planar roofs.

Exemplary embodiments of photovoltaic modules that may be integrated with profiled roofing geometries are described above in detail. The methods, apparatus, and systems are not limited to the specific embodiments described herein nor to the specific illustrated photovoltaic modules and profiled roofing geometries. While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a solar array, said method comprising:

forming at least one substrate member that includes an upper surface and a lower surface, at least the lower surface is contoured with a shape that at least partially conforms to at least a portion of a contoured roof, wherein the upper surface includes a first arcuate portion and a second arcuate portion that form a substantially sinusoidal shape, and a plurality of substantially planar regions, wherein the first arcuate portion includes a first end and a second end such that the first arcuate portion extends arcuately from the first end to the second end, wherein the first arcuate portion is offset a predetermined height above the second arcuate portion, wherein each of the plurality of substantially planar regions extends from the first arcuate portion a distance above the first arcuate portion and is oriented to receive at least one photovoltaic laminate; and coupling the at least one substrate member to at least a portion of the contoured roof.

2. A method in accordance with claim 1 wherein forming the at least one substrate member comprises one of:

forming the at least one substrate member with a shape that includes a plurality of alternating first arcuate portions and a plurality of second arcuate portions; and forming at least one cutout area within the at least one substrate member.

3. A method in accordance with claim 1 further comprising coupling a photovoltaic laminate to the plurality of substantially planar regions.

4. A method in accordance with claim 2 wherein forming the at least one substrate member further comprises forming the at least one substrate member with a contoured shape that at least partially defines at least one of:

at least one upper cooling channel;

at least one lower cooling channel; and at least one warm air vent channel that is coupled in flow communication with at least one of the at least one upper cooling channel and the at least one lower cooling channel.

5. A method in accordance with claim 2 wherein forming the plurality of alternating first arcuate portions and plurality of second arcuate portions comprises:

coupling a first of said at least one substrate member to a second of said at least one substrate member at a perimeter of at least one of the first and second substrate members; and coupling at least one of the first of said at least one substrate member and the second of said at least one substrate member at a perimeter of at least one of the first and second substrate member to the roof using at least one of the perimeter portion of the first and second substrate members.

6. A method in accordance with claim 1 further comprising:
forming at least one wiring slot within at least a portion of the at least one substrate member; and
forming a cutout at least within one of the first and second arcuate portions that is sized to receive at least a portion of a junction box therein.

7. A photovoltaic module comprising:
at least one substrate member that includes an upper surface and a lower surface, at least said lower surface is contoured with a shape that at least partially conforms to at least a portion of a contoured roof, wherein said upper surface includes a first arcuate portion and a second arcuate portion that form a substantially sinusoidal shape, and a plurality of substantially planar regions, wherein said first arcuate portion comprises a first end and a second end such that said first arcuate portion extends arcuately from said first end to said second end, wherein said first arcuate portion is offset a predetermined height above said second arcuate portion, wherein each of said plurality of substantially planar regions extends from said first arcuate portion to a distance above said first arcuate portion and is oriented to receive at least one photovoltaic laminate; and
said at least one photovoltaic laminate coupled to said plurality of substantially planar regions.

8. A photovoltaic module in accordance with claim 7 wherein said at least one substrate member is configured to conform to at least a portion of a S-tiled roof.

9. A photovoltaic module in accordance with claim 8 wherein said at least one substrate member is formed with a contoured shape that comprises a plurality of the first arcuate portions and a plurality of the second arcuate portions.

10. A photovoltaic module in accordance with claim 9 wherein at least one of said plurality of the first arcuate portions and said plurality of the second arcuate portions comprises:
at least one wiring slot defined therein; and
a cutout sized to receive at least a portion of a junction box therein.

11. A photovoltaic module in accordance with claim 9 wherein at least some of said plurality of the first arcuate portions and said plurality of the second arcuate portions at least partially define at least one perimeter portion, said at least one perimeter portion is configured to couple at least one of:
a first of said at least one substrate member to a second of said at least one substrate member; and
at least one of said first of said at least one substrate member and said second of said at least one substrate member to the roof.

12. A photovoltaic module in accordance with claim 7 further comprising at least one cooling channel; wherein said at least one cooling channel comprises at least one of:
at least one upper cooling channel coupled in flow communication with at least one warm air vent channel; and
at least one lower cooling channel coupled in flow communication with said at least one warm air vent channel.

13. A solar array comprising:
at first photovoltaic module; and
a second photovoltaic module coupled to said first photovoltaic module, said first photovoltaic module and said second photovoltaic module each comprise:
at least one substrate member that includes an upper surface and a lower surface, at least said lower surface is contoured with a shape that at least partially conforms to at least a portion of a contoured roof, wherein said upper surface includes first arcuate portion and a second arcuate portion that form a substantially sinusoidal shape, and a plurality of substantially planar regions, wherein said first arcuate portion comprises a first end and a second end such that said first arcuate portion extends arcuately from said first end to said second end, wherein said first arcuate portion is offset a predetermined height above said second arcuate portion, wherein each of said plurality of substantially planar regions extends from said first arcuate portion to a distance above said first arcuate portion and is oriented to received at least one photovoltaic laminate; and
said at least one photovoltaic laminate coupled to said plurality of substantially planar regions.

14. A solar array in accordance with claim 13 wherein said at least one substrate member is configured to conform to at least a portion of a S-tiled roof.

15. A solar array in accordance with claim 14 wherein said at least one substrate member is formed with a contoured shape that comprises a plurality of the first arcuate portions and a plurality of the second arcuate portions.

16. A solar array in accordance with claim 15 wherein at least one of said plurality of the first arcuate portions and said plurality of the second arcuate portions comprises:
at least one wiring slot defined therein; and
a cutout sized to receive at least a portion of a junction box therein.

17. A solar array in accordance with claim 15 wherein at least some of said plurality of the first arcuate portions and said plurality of the second arcuate portions at least partially define at least one perimeter portion, said at least one perimeter portion is configured to couple at least one of:
a of said at least one first substrate member to at least one of said at least one second substrate member; and
at least one of said of said at least one first substrate member and said of said at least one second substrate member to the roof.

18. A solar array in accordance with claim 17 wherein each of said first substrate member and said at least one second substrate member comprise at least a first perimeter portion and second perimeter portion, at least a portion of said first perimeter portion of said first substrate member is coupled at a first joint to at least a portion of said second perimeter portion of said at least one second substrate member.

19. A solar array in accordance with claim 18 wherein each of said first substrate member and said at least one second substrate member further comprise at least a third perimeter portion and a fourth perimeter portion, a portion of said fourth perimeter portion of said first substrate member is coupled at a second joint to at least a portion of the roof, at least a portion of said third perimeter portion of said first substrate member is coupled at a third joint to at least a portion of a fourth perimeter portion of said at least one second substrate member.

20. A method in accordance with claim 1 wherein the at least one substrate member is configured to overlay at least a portion of the contoured roof.

21. A photovoltaic module in accordance with claim 11 wherein the at least one of said first of said at least one substrate member and second of said at least one substrate member is configured to overlay at least one existing roof tile.

22. A solar array in accordance with claim 17 wherein the at least one of said first of said at least one substrate member and second of said at least one substrate member is configured to overlay at least one existing roof tile.

* * * * *